No. 724,884. PATENTED APR. 7, 1903.
J. L. KINGSTON.
RUG FASTENER.
APPLICATION FILED MAR. 31, 1902.
NO MODEL.
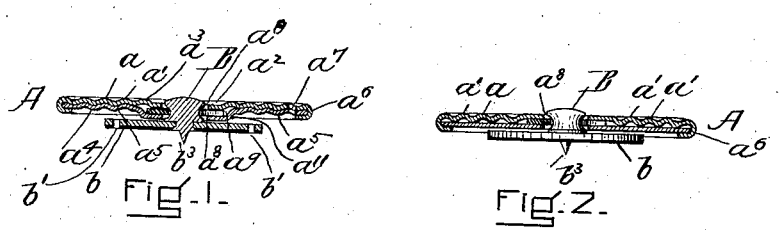
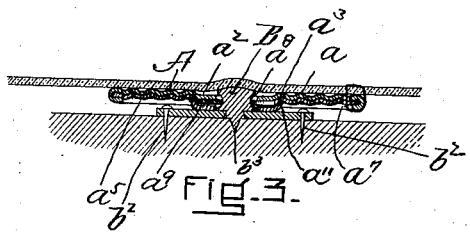
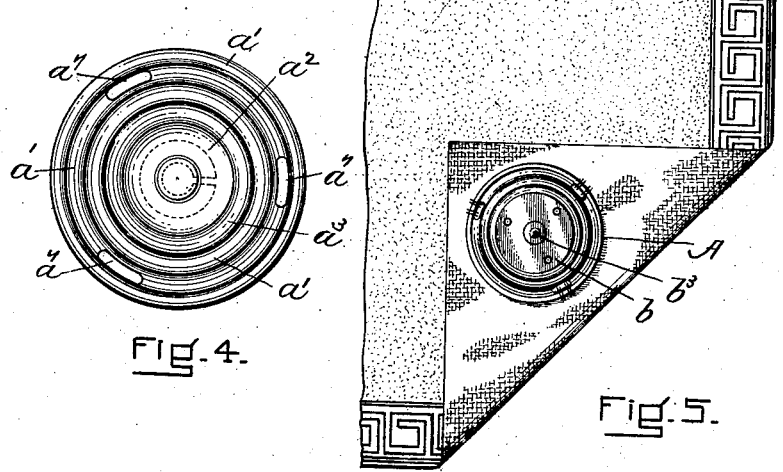
WITNESSES: INVENTOR

UNITED STATES PATENT OFFICE.

JAMES L. KINGSTON, OF BOSTON, MASSACHUSETTS.

RUG-FASTENER.

SPECIFICATION forming part of Letters Patent No. 724,884, dated April 7, 1903.

Application filed March 31, 1902. Serial No. 100,683. (No model.)

*To all whom it may concern:*

Be it known that I, JAMES L. KINGSTON, a citizen of the United States, residing at Boston, in the county of Suffolk and State of Massachusetts, have invented a new and useful Improvement in Rug-Fasteners, of which the following is a full, clear, and exact description, reference being had to the accompanying drawings, forming a part of this specification, in explaining its nature.

The invention relates to the herein-described improvement in rug-fasteners; and it consists in the construction of the socket member of the fastener whereby it is strengthened and the stud member protected; and it further consists in means whereby both are used as a marker in indicating after the attachment of the socket member to the rug or carpet the position in which the stud member shall be fastened to the floor.

I will now describe the invention in conjunction with the drawings forming a part of the specification, wherein—

Figure 1 is a view, principally in vertical central section, of the two parts of the fastener, but not attached to a rug. Fig. 2 is a view representing a modified form of the socket member and the stud member in elevation. Fig. 3 shows the parts in operative position, the socket member secured to the under side of a rug and the stud member to a floor. Fig. 4 is a view in plan of the device. Fig. 5 is a view of a rug having a corner turned back to expose its under surface and also the socket and stud members as attached thereto, showing the manner in which the stud member is used as a marker before it is secured to the floor.

Referring to the drawings, A represents the socket member of the fastener, being the member which is attached to the under surface of the rug or carpet, preferably by sewing, and B is the stud member or the one which is fastened to the floor and from which rises the stud which engages the socket member held by the carpet. Both members must be thin in order not to raise or lift the rug or carpet where they are, and thus disturb its level. The socket member A is in many respects like the one previously patented to me; but it varies from it in the construction of its upper and under plates. In the patented construction these were substantially flat and in use were liable to become bent from shape or otherwise injured. By my present invention these plates are stiffened by being provided with concentric corrugations, each plate having corrugations of the same size and arrangement so disposed as to fit into the corrugations of the other. The plates are connected at their outer edge by binding or in any other desired way and have holes near the edge for the reception of the thread used in sewing them to the rug or carpet. The inner corrugations act to provide a depressed center in the upper surface of the socket member, whereby two results are obtained—first, the center of the fastener is thus formed to be against the floor, and, second, a protecting-rib for shielding the head of the stud is formed upon the upper surface of the fastener. The two plates at the center are separated sufficiently to receive a wire or other spring for engaging the stud. The inner corrugations of the lower plate serve to hold the spring in place, and each of the plates is provided with a central hole through which the stud extends, the spring being so formed and arranged as to project slightly within the circumference of the hole to engage the side of the stud.

$a$ is the upper plate of the socket member; $a'$, its concentric corrugations; $a^2$, its depressed center; $a^3$, the inner corrugation, which forms and surrounds it and provides protection for the stud.

$a^4$ is the lower plate; $a^5$, its corrugations; $a^6$, the outer edge of the plates bound together; $a^7$, the sewing-holes.

$a^8$ is the central stud-hole in both plates; $a^9$, the chamber between them. $a^{10}$ is the stud-engaging spring held in said chamber.

$a^{11}$ is the corrugation of the lower plate, which forms the outer wall to the chamber.

It will be understood that the corrugations are rounded upwardly and that they fit into each other, thereby reducing the thickness of the structure as well as strengthening it.

The stud member B has the relatively large circular plate $b$, which bears on the floor and in which are holes $b'$, through which attaching-nails $b^2$ are driven into the floor. It also has projecting from its under side at the center in line with the stud the marker $b^3$. This, preferably, is pointed and is of any desired length. Its principal purpose is to mark upon the floor the position which the stud member should have to it before it is attached to the floor, although it also serves as a reinforcing means to the attaching-nails for preventing lateral displacement of the stud. It is used as a marker in the following way and in connection with the socket member to which it is then attached: The socket member is first sewed to the under surface of the rug or carpet with the stud member in position in the socket member. The rug or carpet is then laid upon the floor, adjusted to its position, drawn sufficiently taut, and the fastener then pushed downward with enough pressure to cause the marker to enter the floor and form a mark or depression therein. The portion of the rug covering the spot is then removed, the stud member detached from the socket member and located upon the floor with its marker in the hole which it previously made, and the attaching nails or devices for permanently attaching the stud to the floor are then driven through the holes in the plate b. Of course screws may be used instead of nails.

Preferably the stud is solid, and its upper end acts as an anvil for receiving such blows as may be necessary for marking the spot in the first instance and afterward in adjusting the stud member to the floor.

If desired, the upper plate only of the socket member may be corrugated and the under plate left flat, in which case the corrugated upper plate, excepting at the center, rests upon the under plate, and this modification is represented in Fig. 2.

The advantages of the invention have been described incidentally with the construction and need not further be enlarged upon.

While I have described the invention as applicable to secure rugs and carpets to floors in a detachable way, I would not be understood as limiting the invention to this use, as it may be used in connection with any other article of furnishing and whether attached to a floor or to a wall or other support or holder, and while I have used the terms "rug," "carpet," and "floor" in the claims I do not use such terms in a restricting sense.

Having thus fully described my invention, I claim and desire to secure by Letters Patent of the United States—

1. A detachable, applying fastener for rugs, carpets and the like consisting of two members, one of which is attached to the rug or carpet and the other of which is secured to the floor and which have a detachable relation to each other, the floor member of which has a fixed, centrally-located marker upon its under surface and is adapted to be temporarily combined with the other member after the attachment of the latter to the rug or carpet and while the marker is being used in fixing the position of the rug and the future operative position of the fastener and to then be dissociated from the attached member while it is being secured to the floor in the position previously indicated by the marker.

2. A fastener for rugs, carpets and the like comprising stud and socket members, the stud member of which has a plate, a marker centrally located in line with the stud of said member and a stud member upon the other side of said plate over the marker.

3. A fastener for rugs, carpets and the like comprising stud and socket members, the stud member of which comprises a plate, and a fixed marker and fixed stud integral with each other and rigidly secured to the plate with the marker extending from one surface thereof and the stud from the other surface thereof.

4. A fastener for rugs, carpets and the like comprising stud and socket members, the socket member of which is of annular formation and through the central hole of which the head of the stud member extends whereby it is exposed to receive pressure or a blow, a stud-engaging spring carried by said socket member, and a marker rigidly secured to the under surface of the stud member in line with the stud.

5. A fastener for rugs, carpets and the like comprising stud and socket members, the stud member of which is adapted to be secured to the floor and so as to extend therefrom and the socket member to be attached by sewing to the under surface of the rug or carpet, the said socket member consisting of two plates, both annular and one of which is corrugated, a stud-engaging spring carried by said socket member, the head of the stud member extending through the central hole of the socket member and the corrugated plate of the socket member serving to protect the socket member and the stud member from injury, as and for the purposes set forth.

6. A fastener for rugs, carpets and the like comprising stud and socket members, the socket member of which is composed of two plates of annular shape fastened together upon their outer edge by the lapping of one upon the other and which plates have concentric corrugations which match surrounding their central opening to strengthen the member and to protect the head of the stud member when extended through the said opening.

7. A fastener for rugs, carpets and the like comprising stud and socket members, the socket member of which is composed of two annular plates fastened upon their outer edge by the overlapping of one upon the other, provided with a central stud-hole and with concentric corrugations which match, the two plates being slightly separated about the stud-hole, and a stud-holding spring contained in the space thus formed.

8. A fastener for rugs and carpets comprising stud and socket members, the stud member of which is adapted to be secured to the floor, and is provided with a marker upon its under surface by which its placement upon said floor may be ascertained primarily to its attachment thereto, and means whereby said socket member may receive said stud so that its head will bear against the under surfacing of the carpet or rug as and for the purposes set forth.

JAMES L. KINGSTON.

Witnesses:
F. F. RAYMOND, 2d,
J. M. DOLAN.